United States Patent [19]

Kinsinger

[11] 4,058,218
[45] Nov. 15, 1977

[54] APPARATUS FOR REMOVING A SHEET FROM A STACK OF SHEETS

[75] Inventor: William C. Kinsinger, New York, N.Y.

[73] Assignee: Metagraphic Systems, Inc., Bronx, N.Y.

[21] Appl. No.: 717,922

[22] Filed: Aug. 26, 1976

[51] Int. Cl.² ............................................. B07C 5/12
[52] U.S. Cl. ................................ 209/80.5; 209/110.5
[58] Field of Search .......................... 209/80.5, 110.5; 271/170

[56] References Cited

U.S. PATENT DOCUMENTS

| 1,662,669 | 3/1913 | Hallett, Jr. | 209/110.5 |
| 3,310,303 | 3/1967 | Schmidt | 271/170 |

*Primary Examiner*—Allen N. Knowles
*Attorney, Agent, or Firm*—Lerner, David, Littenberg & Samuel

[57] ABSTRACT

Apparatus is disclosed for removing any sheet selected from a stack of sheets without removing adjacent unselected sheets in the stack. The apparatus includes means for selecting and withdrawing the desired sheet in a forward direction from the lead end of the stack, and support means, such as a plate, arranged adjacent to the stack of sheets. Mounted on the plate are sheet-engaging means in the form of a pair of buckling fingers, which extend alongside the lead end of the stack and are adjacent the stack corners. The buckling fingers extend in a direction perpendicular to the forward direction that the selected sheet is moved upon being withdrawn from the stack. The buckling fingers serve a dual purpose: they are operable to resist the forward movement of the unselected sheets as they are withdrawn with the selected sheet; and they are also operable to apply a force against the sides of the selected sheet to buckle it as it is being withdrawn in the forward direction from the stack by the selecting means and past the buckling fingers. The buckling of the selected sheet overcomes the forces tending to maintain the selected sheet in contact with the adjacent unselected sheets which forces include frictional drag, electrostatic adhesion, and inertia. By overcoming these forces, the selected sheet, when buckled, can be easily withdrawn from the stack without removing the adjacent unselected sheets.

10 Claims, 4 Drawing Figures

APPARATUS FOR REMOVING A SHEET FROM A STACK OF SHEETS

FIELD OF THE INVENTION

The present invention relates generally to the art of withdrawing a single sheet from a stack of sheets, and specifically to an improved mechanism which includes one or more members which operate to restrain the forward movement of the unselected sheets of the stack, while at the same time operating to buckle the selected sheet so that is can be withdrawn from the stack.

BACKGROUND OF THE INVENTION

In the art of removing a single selected sheet from a stack of sheets, it has long been a problem to develop mechanisms for accomplishing this function which are simple in structure and which operate quickly and efficiently. The problem of withdrawing only a single sheet from a stack of sheets without removing unselected sheets is created by frictional drag between adjacent sheets, electrostatic adhesion between adjacent sheets, and the forces of inertia on adjacent unselected sheets caused by the forward movement of the selected sheet.

To overcome these problems in the past, there has been developed a number of mechanisms to insure the withdrawal of only a single sheet from the stack of sheets. Such mechanisms typically include inserting sheet-separating devices into the stack, use of air streams, joggling the stack of sheets, and various types of mechanical picker arms. However, such arrangements all have the drawbacks of being unduly complex, unreliable in operation, or too costly to employ. Moreover, most of the prior art devices relate to apparatus for withdrawing the top sheet from a stack of sheets and do not even provide means for selecting a single sheet from any level in the stack. Of course, the problems of withdrawing a sheet from an intermediate level in the stack are much more complex than merely withdrawing the top sheet from a stack of sheets. That is, the forces of electrostatic adhesion, frictional drag, and inertia tending to resist the withdrawal of only a single sheet are much greater when the sheet is being selected from an intermediate level of a stack.

Accordingly, it is an object of the present invention to provide apparatus which overcomes one or more of the aforesaid problems. Specifically, it is within the contemplation of the present invention to provide a mechanism for removing any sheet selected from a stack of sheets without removing the adjacent unselected sheets in the stack by employing a mechanism which is extremely simple in structure, reliable and efficient in operation, and inexpensive to manufacture.

It is a further object of the present invention to provide a mechanism for removing any sheet selected from a stack of sheets without removing the adjacent unselected sheets in the stack by restraining the movement of the unselected sheets, and by buckling the selected sheet so that is becomes spaced from the adjacent unselected sheets, and overcomes the forces of frictional drag, electrostatic adhesion, and inertia which tend to maintain the selected sheet in contact with the unselected sheets.

SUMMARY OF THE INVENTION

Briefly, in accordance with the principles of the present invention, an improved apparatus is provided for removing any sheet selected from a stack of sheets without removing adjacent unselected sheets in the stack. The apparatus includes means for selecting and withdrawing the desired sheet in a forward direction from the lead end of the stack. Such selecting and withdrawing means may include any selection apparatus known in the art which would operate to perform the desired selection function, and specifically may include the selection mechanism disclosed and claimed in the copending application, Ser. No. 717,923, filed on the same date herewith, and assigned to the same assignee as the present application.

The apparatus also includes support means, which may be in the form of a plate, arranged adjacent to the stack of sheets, and preferably on the top or bottom thereof. Sheet engaging means, in the form of a pair of buckling fingers, are mounted on the support plate and extend vertically alongside the leading end of the stack and adjacent to the corners of the stack. The buckling fingers extend in a direction perpendicular to the forward direction that the selected sheet is moved upon being withdrawn from the stack.

The buckling fingers serve a dual function: they are operable to restrain or resist the forward movement of the unselected sheets of the stack; and they are also operable to apply a lateral force against the sides of the selected sheet to buckle the selected sheet as it is being withdrawn in the forward direction from the stack by the selecting means so that the buckled selected sheet has a decreased width which will allow it to pass between the buckling fingers by itself without carrying with it the adjacent unselected sheets which, due to the continued restraining action of the buckling members, remain in the stack.

Depending on the type of material which the sheets in the stack are formed of, the buckling fingers may be either rigid or flexible. For example, if the sheets in the stack are in the form of plastic cards, it is preferable to have the buckling fingers flexible to avoid any damage to the plastic cards. However, if this is not a problem, the buckling fingers may be rigid or nonflexible. It should also be noted that depending on the type of sheets being employed, the buckling fingers may either be movable or nonmovable. For example, if the sheets are in the form of plastic cards, it is preferable to have the buckling fingers movable outwardly or away from each other so as not to apply too great a force against the sides of the selected sheet, which might operate to damage it. By having the buckling fingers movable outwardly, the selected sheet, as it is buckled between the buckling fingers, can operate to move the buckling fingers sufficiently apart so as to provide sufficient space therebetween for the selected sheet as it is being withdrawn.

Moreover, it should also be noted that the present invention contemplates the use of only a single buckling finger, which would operate in conjunction with a wall or other suitable stop member arranged on the other side of the stack, so that the buckling finger would operate to buckle the selected sheet between the buckling finger and the wall or stop member located on the other side of the stack.

Buckling the selected sheet overcomes the forces tending to maintain the selected sheet in contact with the unselected, adjacent sheets in the stack. More particularly, such forces tending to maintain the sheets in contact are known to include, for example, electrostatic adhesion between the adjacent sheets, frictional drag developed between the adjacent sheets, and the forces of inertia created by the selected sheet moving in a forward direction and thereby tending to carry with it the adjacent unselected sheets. Buckling of the selected sheet substantially reduces the forces of electrostatic attraction, frictional drag, and inertia, thereby allowing the selected sheet to be easily withdrawn from the stack.

BRIEF DESCRIPTION OF THE DRAWINGS

Further objects, features, and advantages of the present invention will become apparent upon the consideration of the following detailed description of a presently-preferred embodiment when taken in conjunction with the accompanying drawing, wherein.

DETAILED DISCUSSION OF THE PREFERRED EMBODIMENT OF THE INVENTION

Figure 1:
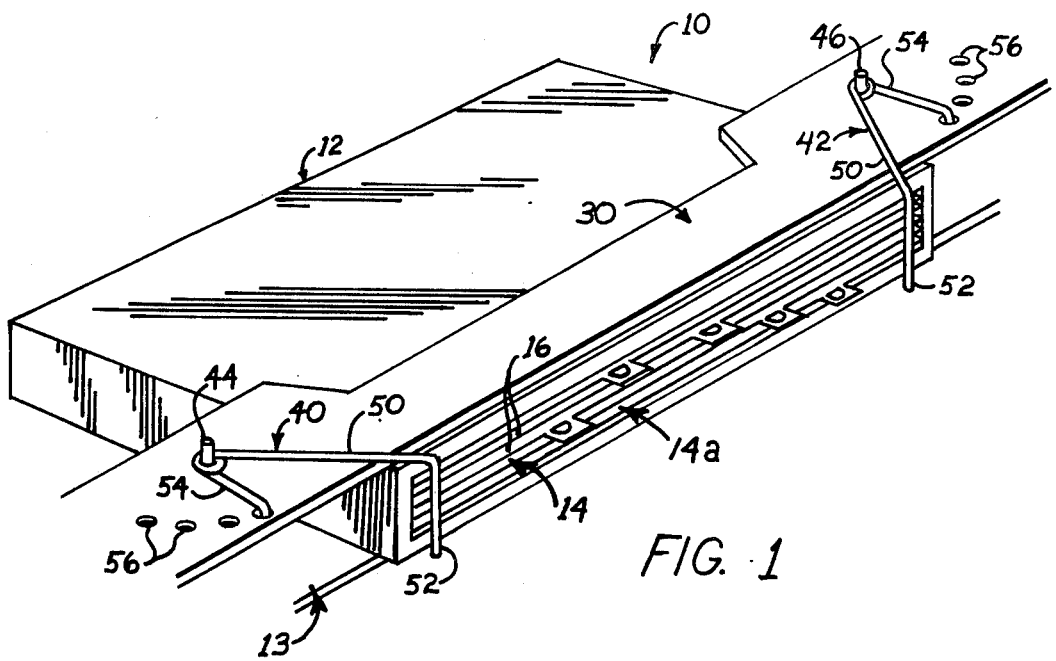
FIG. 1 is a perspective view of a cartridge containing a stack of sheets from which a sheet is to be withdrawn by employing the buckling fingers of the present invention.

Referring now to FIG. 1, there is shown the improved apparatus of the present invention, generally designated by the reference numeral 10. It first should be noted that this invention has a broad application and may be employed in any environment which requires the removal of any sheet selected from a stack of sheets without removing the adjacent unselected sheets in the stack. However, the concepts of the present invention will be illustrated and described in the present specification with respect to a cartridge containing a stack of plastic cards containing microfilmed information, for example, of the type described in the copending application, filed on the same date herewith, Ser. No. 717,923, and assigned to the same assignee as the present application. However, although this invention will be described with respect to this particular application, it should be clearly understood that the concept of the present invention is not limited thereto.

Figure 2:
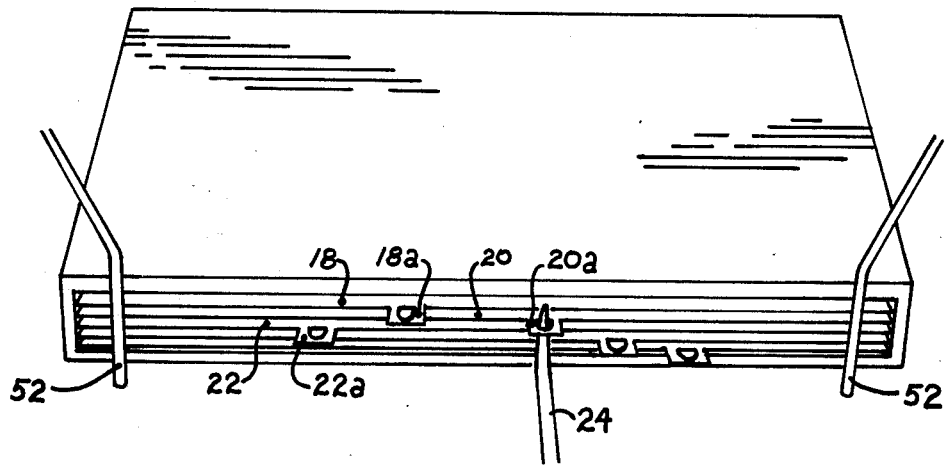
FIG. 2 is also a perspective view of the front portion of the cartridge illustrating the operation of the selection means for selecting and withdrawing the desired sheet in a forward direction from the lead end of the stack of sheets in the cartridge.

The cartridge 12 contains a stack 14 of plastic cards 16, and each of the cards 16 may contain microfilmed information. The cartridge 12 is secured in position in suitable selection apparatus by suitable mounting means 13, which forms no part of the present invention. For purposes of clarity, three of the cards in the stack will be identified by reference numerals 18, 20, and 22. As shown most clearly in FIG. 2, each of the cards 18, 20, and 22 include respective selection tabs 18a, 20a, and 22a. In addition, suitable means for selecting and withdrawing the desired sheet in a forward direction from the lead end 14a of the stack 14 may also be provided. For purposes of illustration, the selection means may include a movable carriage (not shown) having a plurality of selection fingers, such as 24, which may be inserted in one of the tabs 18a, 20a, or 22a to select and withdraw the desired sheet 18, 20, or 22. Reference is made to the copending application identified above for a disclosure of a particular arrangement of a suitable carriage and a plurality of selecting fingers. Also for purposes of illustration, the present invention will be explained with respect to the selection and withdrawing of central card 20 from the stack 14, as shown most clearly in FIG. 2.

The apparatus for removing the selected sheet 20 includes support means, which may be in the form of a plate 30, arranged adjacent to the stack of sheets 14. In this particular embodiment, plate 30 is arranged above the stack, although it should be noted that the plate 30 may also be arranged below the stack 14.

In addition, sheet-engaging means, which may take the form of buckling fingers 40, 42, are also provided in accordance with the present invention. The buckling fingers 40, 42 are mounted on plate 30 in any suitable manner, such as by pins or screws 44, 46, respectively. In the particular embodiment illustrated, buckling fingers 40, 42 are in the form of flexible spring members which are movable relative to the selected sheet 20. As each of the buckling fingers are identical, it will only be necessary to describe one of the buckling fingers in detail. Buckling finger 40 includes a first arm 50 and a second arm 52, with the first arm 50 extending from the attachment means 44 on plate 30 to the lead end 14a of the stack. The second arm 52 is connected to arm 50 and extends vertically alongside the lead end 14a of the stack, adjacent to and spaced from the stack corner and in a direction perpendicular to the forward direction that the selected sheet 20 is moved upon being withdrawn by selection means 24 from the stack 14. In addition, each of the buckling fingers 40, 42 include a third arm 54 connected to the attachment means which is biased against a suitable stop means, such as hole 56. Moreover, a number of holes 56 may be provided in order to adjust the tension on the buckling fingers. Accordingly, in a manner to be explained, as the selected sheet 20 is withdrawn from the stack, it applies an outwardly directed force against arms 52 of the buckling fingers 40, 42, which are biased outwardly to pivot about attachment means 44, 46 and to bias respective arms 54 against stops 56. In this manner, arms 52 are continually biased against the sides of selected sheet 20 to buckle it while it is being withdrawn from cartridge 12, without arms 52 applying too great a force against the sides of the selected sheet 20 to damage it. Arms 52 build up sufficient spring force to spring back into their unbiased position when the selected sheet 20 is reinserted within cartridge 12. Before describing the operation of buckling fingers 40, 42 in detail, the forces which must be overcome in order to insure the selection and removal of a single sheet from a stack of sheets will now be explained.

The forces tending to maintain sheets 18, 20, and 22 in contact with each other, as the selected sheet 20 is being withdrawn from stack 14, include forces of inertia, frictional drag, and electrostatic adhesion. More particularly, with respect to the inertial forces, since the stack is disposed in a horizontal plane, when it is attempted to remove a single sheet from the stack, the unselected sheets adjacent to the selected sheet also tend to move forward with the selected sheet. With respect to the forces of frictional drag, since the planar surfaces of each sheet are in contact with the planar surfaces of the adjacent sheets, there is sufficient frictional forces between them to cause the selected sheet 20 to also pull the adjacent unselected sheets in a forward direction when it is attempted to remove the selected sheet from the stack. With respect to the forces of electrostatic adhesion, the adjacent sheets build up an electrostatic attraction between each other so that this force tends to keep the sheets in contact with each other when one of the sheets is being withdrawn. Accordingly, the buckling fingers 40, 42 of the present invention provide a simple and inexpensive arrangement for overcoming these forces to insure that any sheet selected from the stack of sheets may be removed without removing adjacent unselected sheets in the stack.

Figure 3:
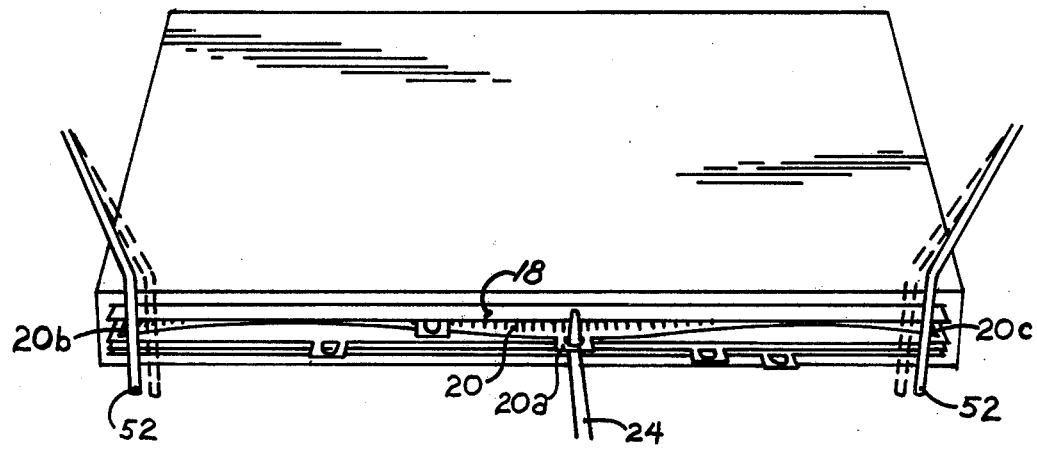
FIG. 3 is also an enlarged perspective view illustrating the coaction of the buckling fingers and the selected sheet as it is being withdrawn past the buckling fingers.

The operation of buckling fingers 40, 42 will now be described in detail with reference to FIGS. 3 and 4. After the desired sheet 20 is selected, by appropriate selection means 24 being inserted in tab 20a of the selected sheet 20, the selection means 24 begins to pull selected sheet 20 out of the stack 14. As shown in FIG. 3, because of the forces discussed above, the adjacent unselected sheets 18, 22 are also withdrawn from the stack and move in a forward direction to a point where each of the sheets 18, 20, and 22 engages and butts against arms 52 of the buckling fingers 40, 42. Then, as shown most clearly in FIG. 3, the selected sheet 20, which continues to be pulled in a forward direction by selection means 24, is caused by arms 52 of buckling fingers 40, 42 to buckle or bow along its side edges 20b, 20c in order that the selected sheet 20 may be pulled through the decreased space or width defined by arms 52. Simultaneously, arms 52 operate to apply a sufficient force against the leading edges of unselected sheets 18, 22 sufficient to overcome the forces tending to maintain these unselected sheets in contact with selected sheet 20. In this manner, arms 52 operate to resist further forward movement of the unselected sheets 18, 22 so that these sheets butt against arms 52.

Accordingly, as shown most clearly in FIG. 3, selected sheet 20 begins to buckle or bow due to the lateral forces applied to its side edges 20b, 20c by arms 52 of buckling fingers 40, 42, and buckling fingers 40, 42 are partially deflected from their dotted-line positions. The buckling of the selected sheet 20 causes it to be narrower than the adjacent unselected sheets 18, 22, so that the narrower selected sheet 20 is able to be pulled through the obstruction caused by arms 52, while remaining unselected sheets 18, 22 continue to butt against arms 52 and are prevented from moving further in the forward direction with selected sheet 20.

Figure 4:
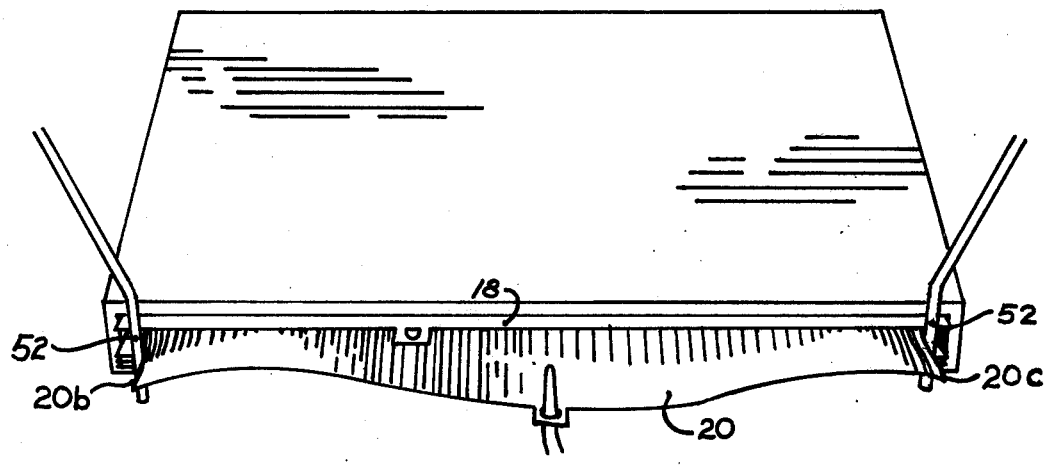
FIG. 4 is a perspective view illustrating the selected sheet in its buckled position after it has moved past the buckling fingers to its extracted position.

In addition, as shown most clearly in FIG. 4, selected sheet 20 is buckled in a wave-like pattern so that it contacts adjacent sheets 18, 22 only at various points of minimum contact with relatively large spaces or gaps being formed between the points of contact and the adjacent unselected sheets 18, 22. As a result, because selected sheet 20 is buckled so that the area of surface contact with the adjacent sheets 18, 22 is minimized, the inertial forces tending to move the unselected sheets in a forward direction with the selected sheet 20 are substantially reduced or eliminated and, therefore, reduces or eliminates the tendency of the unselected sheets 18, 22 to be pulled along with selected sheet 20. In addition, the buckling of sheet 20 greatly reduces the electrostatic attraction between it and the unselected sheets 18, 22, since there are large gaps or spaces where selected sheet 20 does not contact the adjacent unselected sheets 18, 22. Finally, the buckling of the selected sheet 20 causes minimum contact between it and the unselected sheets 18, 22, thereby minimizing frictional drag which tends to move the unselected sheets in a forward direction with the selected sheet 20. Finally, the abutment of the unselected and unbuckled sheets 18, 22 against arms 52 also functions to prevent the unselected sheets from being moved in the forward direction along with the selected sheet 20. Therefore, due to the abutment of the unselected sheets against arms 52, and due to the large spaces and minimum contact area between the selected sheet 20 and the unselected sheets 18, 22, the withdrawal of only the selected sheet 20 from the stack 14 is insured.

It should also be noted that, depending on the type of material which the sheets or cards in the stack 14 are formed of, the buckling fingers 40, 42 may either be flexible or rigid. For example, in the above-described embodiment, since the sheets of the stack are in the form of plastic cards, it is preferable to have the buckling fingers 40, 42 flexible and spring-like to avoid any damage to the plastic cards. However, if the sheets are of a more durable nature, the present invention contemplates that buckling fingers 40, 42 may be rigid or noflexible so that the pair of rigid arms 52 would form a rigid obstruction through which the selected sheet must be moved by buckling thereof.

It should also be noted that, depending on the type of material which the sheets in the stack are formed of, the buckling fingers 40, 42 may be either movable or nonmovable. For example, in the above-described embodiment, since the sheets are in the form of plastic cards, it is preferable to have buckling fingers 40, 42 movable outwardly about respective attachment means 44, 46. That is, arms 52 would move away from each other to provide a wider space for the selected sheet 20, but arms 52 would still be in engagement with the leading edges of sheets 18, 22 and thereby operate to block their forward movement. In this manner, since the buckling fingers 40, 42 are movable or pivot away from each other, this would insure that arms 52 do not apply too great a force against the sides 20b, 20c of the selected plastic card 20 which might operate to damage it. Therefore, the selected card 20, as it is buckled between the buckling fingers, can operate to move the buckling fingers sufficiently apart so as to provide a sufficiently-wide space therebetween for the selected card to be withdrawn from the stack 14 without damaging the card, while the arms 52 continue to resist the forward movement of the unselected sheets. Again, if the sheets in the stack are of a more durable nature, the buckling fingers may be nonmovable so that arms 52 form a rigid obstruction and define a definite space through which the selected card must be moved by buckling.

Finally, it should also be noted that the present invention also contemplates the use of only a single buckling finger, which would operate in conjunction with a wall or other suitable stop member arranged on the other side of the stack, so that the buckling finger would operate to buckle the selected sheet against the wall or stop member located on the other side of the stack. For example, side 20b of selected card 20 may be stacked against a nonmovable wall member or stop member, such as the side wall 12a of cartridge 12. Then, only a single buckling finger would be necessary at the other side 20c of the selected card 20. In this manner, the single buckling finger would operate to buckle the selected sheet against wall 12a located on the other side of the stack so that wall 12a would take the place of the rigid and nonmovable type of arm 52 described above.

In summary, by providing means for buckling the selected sheet, it overcomes the forces tending to maintain the selected sheet in contact with the unselected sheets of the stack. By buckling of the selected sheet, the forces of electrostatic attraction, frictional drag, and inertia are substantially reduced, thereby allowing the selected sheet to be easily withdrawn from the stack. Moreover, the plate 30 and buckling fingers 40, 42 of the present invention provide an extremely simple mechanism, which is reliable and efficient in operation, and which is inexpensive to produce. Accordingly, the mechanism of the present invention overcomes many of the drawbacks of the prior art devices.

A latitude of modification, change, and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for removing any sheet selected from a stack of sheets without removing adjacent unselected sheets in said stack comprising:

means for selecting and withdrawing a desired sheet in a first direction from one end of said stack;

support means arranged adjacent said stack of sheets;

sheet-engaging means mounted on said support means and extending alongside said one end of said stack adjacent a corner of the stack and extending in a direction substantially perpendicular to the direction that said selected sheet is moved when being withdrawn from said stack;

said sheet-engaging means being operable to resist movement of the unselected sheets in said first direction and being operable to apply a force against at least one side of said selected sheet while the other side of said selected sheet is in contact with a stop member to buckle said selected sheet between said sheet-engaging means and said stop member as it is being withdrawn in said first direction from said stack by said selecting means so that said selected sheet has a decreased width which will allow it to pass said sheet-engaging means while said sheet-engaging means continues to resist the movement of the unselected sheets in said first direction, and so that the area of surface contact of said selected sheet with an adjacent sheet or sheets is substantially reduced.

2. Apparatus in accordance with claim 1, wherein said stop member is defined by the side wall of a container in which said stack of sheets is stacked.

3. Apparatus in accordance with claim 1, wherein said stop member includes a buckling finger.

4. Apparatus in accordance with claim 1, wherein said sheet-engaging means includes a buckling finger.

5. Apparatus in accordance with claim 1, wherein said sheet-engaging means includes a buckling finger, and said stop member includes a buckling finger, with each buckling finger being arranged adjacent one of the corners of the stack.

6. Apparatus in accordance with claim 1, wherein said support means includes a plate arranged above said stack of sheets.

7. Apparatus in accordance with claim 1, wherein said support means includes a plate arranged along the bottom of said stack of sheets.

8. Apparatus in accordance with claim 1, wherein said sheet-engaging means is rigid and is mounted on said support means in a nonmovable manner.

9. Apparatus in accordance with claim 1, wherein said sheet-engaging means is flexible and is mounted on said support means to be movable with respect thereto.

10. Apparatus in accordance with claim 1, wherein said sheet-engaging means includes a first arm and a second arm, said first arm being attached at one end to said support means and the other end of said first arm being connected to said second arm, said second arm extending vertically alongside the lead end of said stack adjacent a stack corner in a direction perpendicular to the forward direction that said selected sheet is moved upon being withdrawn from said stack.

* * * * *